(12) United States Patent
Oowaki et al.

(10) Patent No.: US 6,249,506 B1
(45) Date of Patent: Jun. 19, 2001

(54) MEDIUM ATTACHING DEVICE AND DISK DRIVE APPARATUS

(75) Inventors: Hirohiko Oowaki, Fukuoka; Masayuki Shiwa, Kasuga, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/228,655

(22) Filed: Jan. 12, 1999

(30) Foreign Application Priority Data

Jan. 27, 1998 (JP) .................................................. 10-013740
Jul. 31, 1998 (JP) .................................................. 10-217242

(51) Int. Cl.$^7$ .................................................. G11B 17/028
(52) U.S. Cl. .................................................. 369/271
(58) Field of Search .......................... 360/99.05, 99.08, 360/99.12, 99.04; 369/270, 271, 212, 243

(56) References Cited

U.S. PATENT DOCUMENTS

| 2,937,916 | 5/1960 | Hohnecker . | |
|---|---|---|---|
| 4,351,047 | * 9/1982 | Redlich et al. | 369/270 |
| 4,390,979 | 6/1983 | Saito et al. | 369/270 |
| 5,006,945 | * 4/1991 | Furusawa | 360/99.12 |
| 5,014,143 | * 5/1991 | Mori et al. | 360/99.12 |
| 5,128,818 | * 7/1992 | Koizumi et al. | 360/99.04 |
| 5,166,920 | 11/1992 | Kogure | 369/270 |
| 5,631,894 | 5/1997 | Takahashi | 369/270 |
| 5,637,200 | 6/1997 | Tsymberov | 204/298.15 |
| 5,646,934 | * 7/1997 | Mizuno et al. | 369/290 |
| 5,774,445 | 6/1998 | Sawi et al. | 369/270 |
| 6,005,755 | * 12/1999 | Muse et al. | 360/133 |

FOREIGN PATENT DOCUMENTS

| 61-264547 | 11/1986 | (JP) . |
|---|---|---|
| 684255 | 3/1994 | (JP) . |
| 7153157 | 6/1995 | (JP) . |
| 9147479 | 6/1997 | (JP) . |

* cited by examiner

*Primary Examiner*—William Klimowicz
*Assistant Examiner*—Tianjie Chen
(74) *Attorney, Agent, or Firm*—Stevens, Davis, Miller & Mosher, LLP

(57) ABSTRACT

There is disclosed a medium attaching device and a disk drive apparatus which are suited for a compact and light-weight design and a thin design, and are capable of automatic attachment of a disk. The device includes a rotary support device for holding a disk medium thereon, and a rotation drive device for rotating the rotary support means so as to rotate the disk medium. The rotation drive device includes a reciprocally-moving device for reciprocal movement in a direction of an axis of a rotation shaft. The rotary support device has a plurality of pivotal attaching devices pivotally mounted thereon, and each of the pivotal attaching devices is pivotally movable between a fixed position where the pivotal attaching device fixedly holds the disk medium and a received position where the pivotal attaching device is received in the rotary support device. The plurality of pivotal attaching devices are provided on the rotary support device in concentric relation to the axis of the rotation shaft. The pivotal attaching devices are engaged with the reciprocally-moving device, and are pivotally moved by the reciprocal movement of the reciprocally-moving device, thereby fixing and releasing the disk medium relative to the rotary support device.

19 Claims, 17 Drawing Sheets

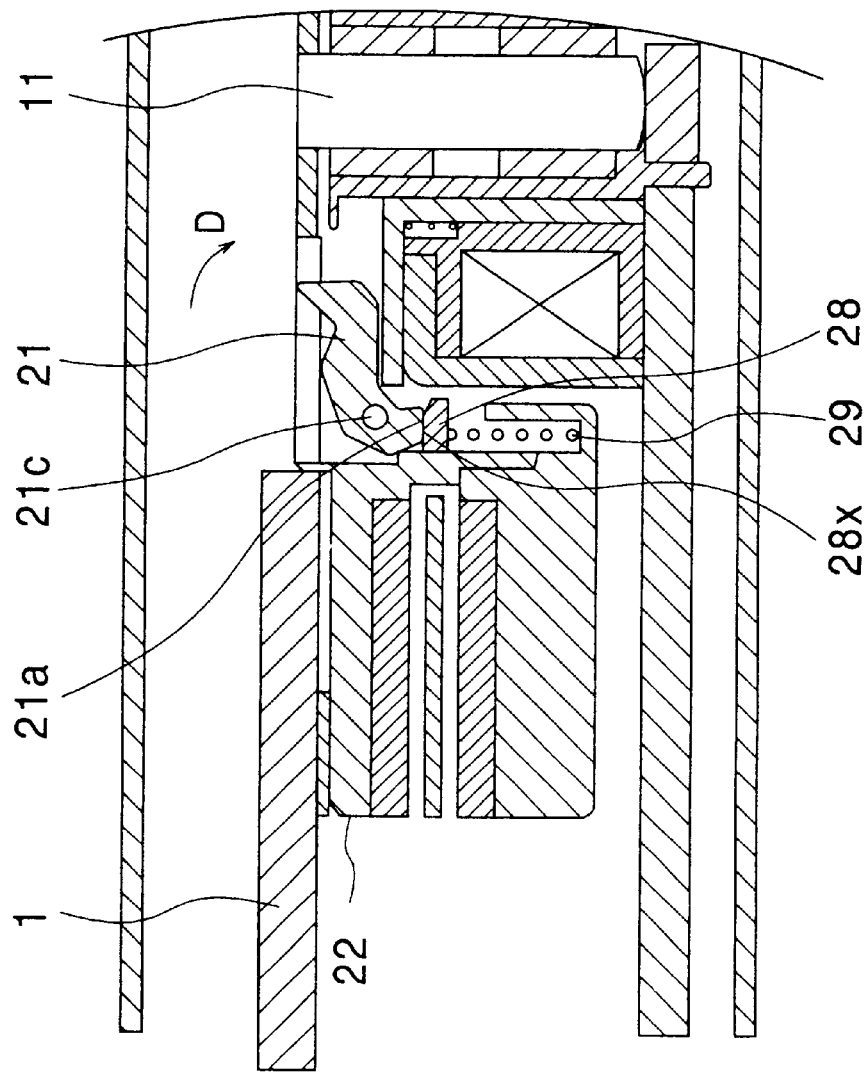

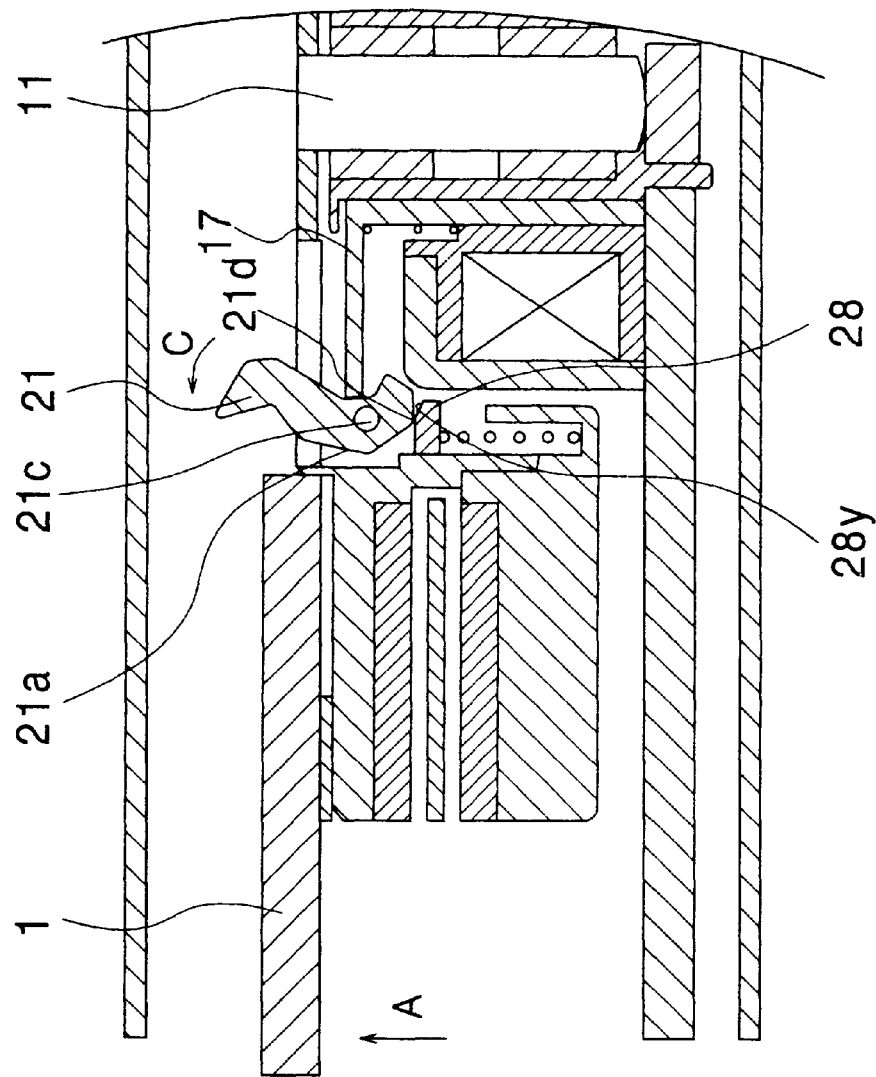

MEDIUM ATTACHING DEVICE AND DISK DRIVE APPARATUS

BACKGROUND OF THE INVENTION

1. Field of the Invention

This invention relates to a disk drive apparatus for driving or rotating a disk medium, and more particularly to a disk medium attaching device capable of releasably attaching a disk thereto.

More specifically, this invention relates to a medium attaching device for holding and releasing a concentric disk medium on a turntable, connected to a motor (rotating device for rotating this turntable), when this disk-like medium is to be driven for rotation. Here, the concentric disk-like mediums (disk media) include, for example, an old-fashioned EP record disk, an MO, a PD, a CD, a CD-ROM, a CD-R, a CD-RW, a DVD-ROM, a DVD-RAM or the like, and these disk mediums will be referred to merely as "disk".

2. Description of the Related Art

Conventional clamp mechanisms for a disk will be described. There have heretofore been used three kinds of clamp mechanisms described below. A first example of them is a disk self-holding type (clamp type) as disclosed in JP-A-9-147479, in which the user himself holds or grasps a disk, and attaches the disk directly onto a turntable which is a constituent part of an optical pickup. This disk holding means is called a ball chuck-type mechanism which comprises hard balls of metal or members of a resin for pressing the disk against the surface of the turntable.

A second conventional example is a mechanism as disclosed in JP-A-6-84255, in which a disk is transferred to a turntable by a disk loading mechanism, and is placed on a center hub, and then a fixing member (called a clamper), having a magnetic body, fixes the disk to the turntable from the upper side of the disk by its magnetic force. For transferring the disk, there is used, for example, a holder for holding a cartridge therein or a tray for placing the disk thereon.

A third conventional example is a method as disclosed in JP-P-61-264547, in which a disk is beforehand contained in a disk case called a cassette, and this cassette is inserted into a disk drive apparatus, and a clamp member, provided above the cassette, cooperates with a magnetic circuit formed by a magnet, provided in a turntable, so as to fix the disk to the turntable.

In each of these mechanisms, the disk is attached to the turntable or the holder by the operator. Therefore, it has been necessary to move the turntable or the holder to a position where this operation can be effected easily. The disk is attached, and the center thereof is aligned with that of the rotation drive portion of the disk drive apparatus, and then the clamp member moves downward to fix the disk. Therefore, it has been necessary to provide upwardly-moving and downwardly-moving mechanisms on the opposite (lower and upper) sides of the disk, respectively.

Recently, with the compact and thin design of disk drive apparatus, the disk drive apparatus is, in many cases, contained in portable personal computers. With this trendency, an optical pickup, which is a key device of the disk drive apparatus, has been required to have a more compact, thinner design. Software, used in computers, has now had a large capacity, and in many cases, inexpensive CD-ROMs have been used as media to be distributed. Therefore, it is now thought natural that the disk drive apparatus should be mounted on the personal computer.

However, the compact and lightweight design of computers has been advanced, and the disk drive apparatus, used as an external memory unit of the computer, has also been required to have a compact, lightweight design and a thin design. Therefore, the tray and the upwardly-moving and downwardly-moving mechanisms have been a barrier to the thin design. And besides, in order that a more comfortable operability of the computer can be provided, there has been a demand for the type of disk drive apparatus which does not require the attaching operation by the operator.

SUMMARY OF THE INVENTION

With the above problems in view, it is an object of this invention to provide a disk drive apparatus suited for a compact and lightweight design and a thin design, and more specifically to provide a medium attaching device and a disk drive apparatus capable of automatic attachment of a disk.

According to the present invention, there is provided a medium attaching device comprising rotary support means for holding a recording medium thereon, and rotation drive means for rotating the rotary support means so as to rotate the recording medium;

wherein the rotation drive means includes reciprocally-moving means for reciprocal movement in a direction of an axis of a rotation shaft;

wherein the rotary support means has a plurality of pivotal attaching means pivotally mounted thereon, and each of the pivotal attaching means is pivotally movable between a fixed position where the pivotal attaching means fixedly holds the recording medium and a received position where the pivotal attaching means is received in the rotary support means, and the plurality of pivotal attaching means are provided on the rotary support means in concentric relation to the axis of the rotation shaft; and wherein the pivotal attaching means are engaged with the reciprocally-moving means, and are pivotally moved by the reciprocal movement of the reciprocally-moving means, thereby fixing and releasing the recording medium relative to the rotary support means.

Further, according to the invention, there is a disk drive apparatus using the above medium attaching device.

The medium attaching device and the disk drive apparatus of the present invention are suited for a compact, light weight design and a thin design, and is capable of automatic attachment of a disk. In the present invention, the rotation drive means and the reciprocally-moving means have common parts, and therefore the compact and thin design can be achieved. Further, in the present invention, even if the disk, when placed on the rotary support member, is slightly out of alignment with the rotary support member and has an error in the thickness of the disk or the diameter of its central hole, this misalignment can be corrected, so that the disk can be positively attached and fixed to the rotary support member.

BRIEF DESCRIPTION OF THE DRAWINGS

FIG. 1A is a schematic top view of the disk drive apparatus, and FIG. 1B is a cross-sectional view taken along the X—X line in FIG. 1A;

FIGS. 2A and 2B are enlarged, cross-sectional views of an important portion of the first embodiment, showing a condition in which a clamp member is received in a turntable; FIG. 2A is a view showing a state that the claim member passes the dead point in rotating in a C direction, and FIG. 2B is a view showing a receiving state;

FIGS. 3A and 3B are enlarged, cross-sectional views of an important portion of the first embodiment, showing a condition in which the clamp member is projected to an engaged position; FIG. 3A is a view showing a state that the clamp member passes another dead point in rotating in a D direction, and FIG. 3B is a view finishing the projection;

DESCRIPTION OF THE PREFERRED EMBODIMENTS

Preferred embodiments of the present invention will now be described with reference to the drawings.

First Embodiment

Figure 1A:
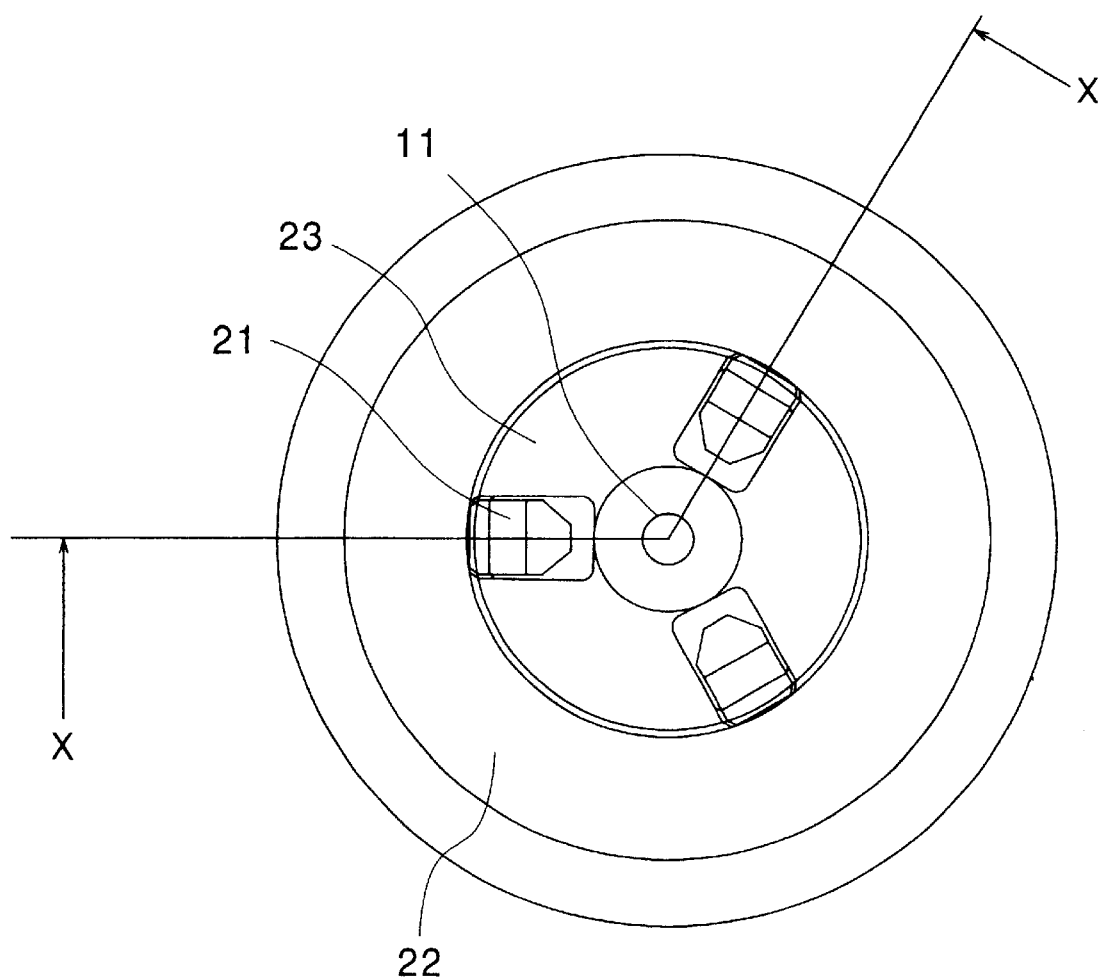
FIGS. 1A and 1B are views of a first embodiment of a disk drive apparatus of the present invention, showing a condition before a disk loading operation is effected.
Figure 1B:
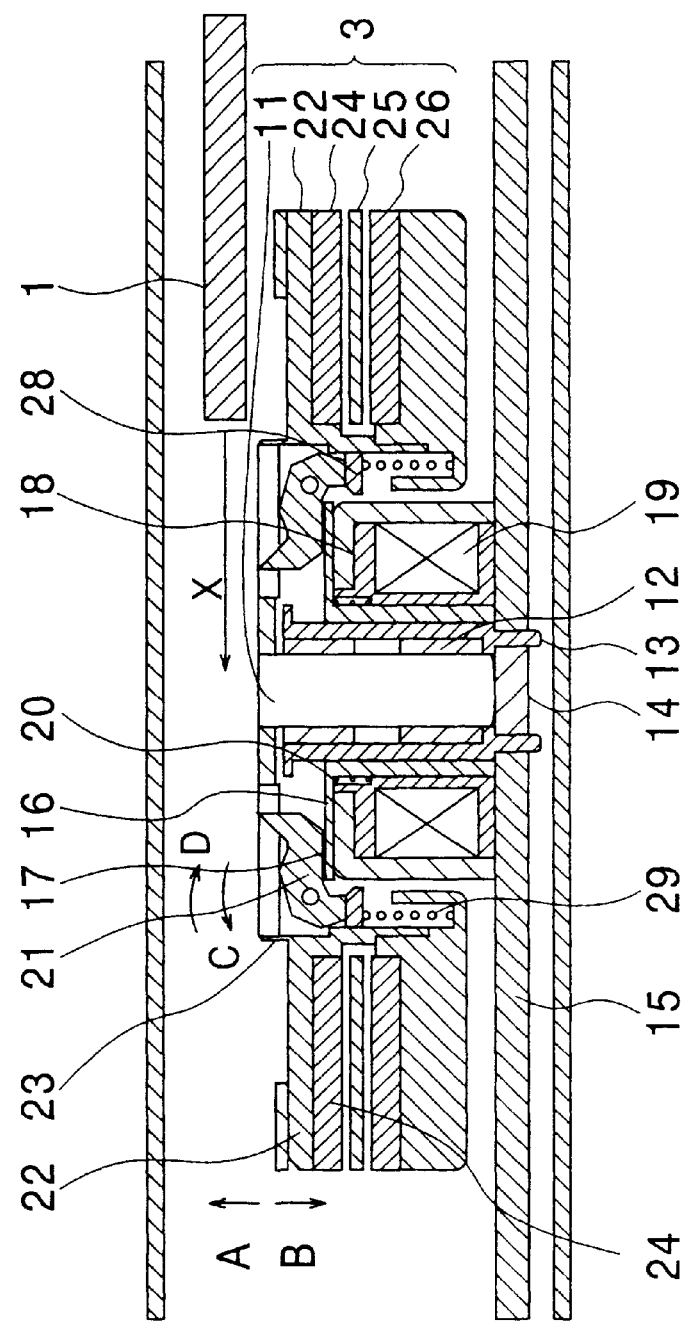

FIGS. 1A and 1B are views of a first embodiment of a disk drive apparatus according to the invention, showing a condition before a disk loading operation is effected. FIG. 1A is a schematic top view of the disk drive apparatus, and FIG. 1B is a cross-sectional view taken along the X—X line in FIG. 1A. In FIGS. 1A and 1B, the disk drive apparatus of the first embodiment includes a spindle motor 3 for rotating a disk 1 on a turntable (rotary support means) 22. A shaft 11 is mounted at a central portion of the spindle motor 3. The shaft 11 rotates at high speed, and therefore is made of a material (e.g. stainless steel (JIS SUS420J2) or the like) having high hardness and high surface precision. A bearing 12 is mounted around the outer periphery of the shaft 11. The shaft 11 is rotatably borne or supported by the bearing 12, with a clearance of several microns formed therebetween. Generally, in view of the cost, this bearing 12 is made of sintered metal, and particularly when the high performance is required, a ball bearing is used as the bearing 12. A bearing housing 13 is provided around the outer periphery of the bearing 12. The bearing 12 is press-fitted into the bearing housing 13. Generally, the bearing housing 13 is made of BsBM (brass), but in the present invention, the bearing housing 13 is made of ordinary ferromagnetic metal (free-cutting steel in this embodiment). A thrust bearing 14 bears a thrust load of the shaft 11. The thrust bearing 14 is made of a resin (e.g. Polyphenylene sulfide (hereinafter referred by PPS), or metal having high strength and good sliding properties. The thrust bearing 14 is mounted on the bearing housing 13. The bearing housing 13 is fixedly secured to a base 15. The base 15 is made, for example, of a ferromagnetic material such as SECE (JIS-G-3313; Electrolytic zinc-coated steel sheets, hereinafter referred by SECE).

A plunger (reciprocally-moving means) 16, having the function of pivotally moving clamp members 21, is provided around the outer periphery of the bearing housing 13 so as to reciprocally move in a direction of the axis of the shaft 11. The plunger 16 is formed into a cylindrical shape having a flange 17. The plunger 16 is made of ordinary ferromagnetic metal (e.g. free-cutting steel). The flange 17 is formed at that end of the plunger 16 directed toward a disk-placing surface (that is, in a direction of arrow A), and extends radially outwardly therefrom. A bobbin 18, made of a resin, is provided around the outer periphery of the plunger 16. The bobbin 18 includes a cylindrical body having flanges formed respectively at opposite ends thereof. A copper wire is wound on an outer peripheral surface of the cylindrical body between the flanges to form a coil 19. The coil 19 serves as magnetizing means or exciting means. In order to enhance the space factor, a square shaped copper wire is used as this copper wire. A plunger spring (compression coil spring) 20 acts between the bobbin 18 and the plunger 16. Therefore, the plunger 16 is urged in the direction of arrow A by the plunger spring 20.

The turntable 22 is mounted coaxially on the shaft 11 at a position adjacent to the flange 17 of the plunger 16. This turntable 22 is formed by precisely machining free-cutting steel (whose surface is plated) using a NC (Numerically controlled) lathe or the like (its roundness is precise on the order of about 10 microns), and the turntable 22 is rotated by the shaft 11. A center hub 23 is formed in a projected manner at a central portion of the turntable 22, and its projected surface is a tapered slant. The center hub 23 can be fitted into a clamp hole 2, formed through the central portion of the disk 1, so as to bring the center of the disk 1 into agreement with the axis of the shaft 11. The amount of projecting of the center hub 23 is not more than the thickness of the disk 1 placed on the turntable 22. In the present invention, the disk 1 is positioned on the turntable 22 by the clamp members 21 (more fully described later), and therefore the configuration of the center hub is not an essential feature of the present invention.

The plurality of clamp members 21 are pivotally mounted on the inner peripheral portion of the turntable 22. These clamp members 21, serving as pivotal attaching means, can be retainingly engaged with the edge of the clamp hole 2 in the disk 1 to fix the disk 1. The clamp member 21 includes a claw portion for engaging with the clamp hole 2, and a cam surface portion in contact with a press plate 28 (described later). As shown in FIG. 1A, the three clamp members 21 are mounted on the turntable 22, and are spaced at equal intervals circumferentially around the shaft 11. With the use of the three clamp members 21, the clamp hole (center hole) 2 can be aligned with the shaft 11. Of curse, the number of the clamp members 21 is not limited to three, but a suitable number of (for example, 4 or 6) clamp members 21 can be used depending on the diameter of the central hole 2 and the press fixing force. The press plate 28 is in the form of an annular, flat plate, and is mounted on the inner peripheral surface of the turntable 22 so as to reciprocally move upward and downward (FIG. 1B). The press plate 28 is held in contact with the cam surface portions of the clamp members 21, and this press plate 28 is urged in the direction of arrow A (FIG. 1B) by a clamp spring (compression coil spring) 29. As shown in FIGS. 1B and 2, the clamp spring 29 extends between the press plate 28 and a pocket portion (recess) formed on a lower portion of the inner peripheral surface of the turntable 22.

Figure 2A:
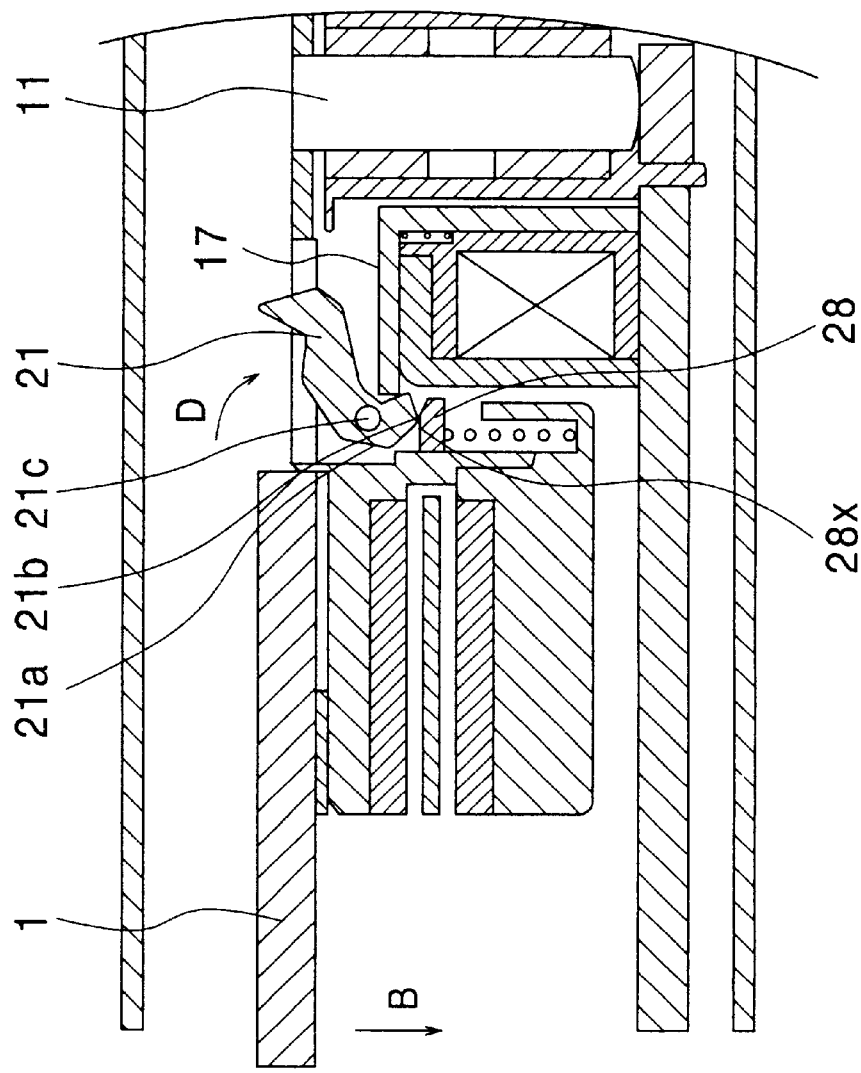

As shown in FIGS. 2A and 3A, the cam surface portion of the clamp member 21 has two dead points (which means points of contact of the cam surface portion 21a with the press plate 28, and an operating line, extending from each of these contact points in the direction of urging of the press plate 28, passes through the axis 21c of pivotal movement. An angular moment to the clamp member 21 will not be generated at these contact points.) corresponding to the angle of pivotal movement (angular movement). When the clamp member 21 is pressed or pushed beyond one dead point 21d by the press plate 28, as shown in FIG. 3A, the clamp member 21 is pivotally moved in a direction to engage with the clamp hole 2, and when the clamp member 21 is pressed beyond the other dead point 21b by the press plate 28, as shown in FIG. 2A, the clamp member 21 is pivotally moved in a direction away from the clamp hole 2, and is received in the turntable 22. Namely, urging means, comprising the press plate 28 and the clamp spring 29, assists the plunger 16 in pivotally moving the clamp members 21, and assists the clamp members 21 in being kept in the engaged position and the received position.

The function of the cam surface portion will be described in further detail. FIG. 2B is an enlarged, cross-sectional view of an important portion, showing a condition in which each clamp member is received in the turntable 22. In FIG. 2B, the cam surface portion 21a of the clamp member 21 is held in contact with a flat surface portion 28x of the press plate 28. The press plate 28 is always urged upwardly by the clamp spring 29, and the flat surface portion 28x is disposed radially outwardly of the axis 21c of pivotal movement, and therefore the clamp member 21 is always subjected to a pivotally-moving force in a direction D. Therefore, even if the clamp member 21 is subjected to slight disturbance such as vibration, the clamp member 21 can be kept in the received condition.

Figure 3B:
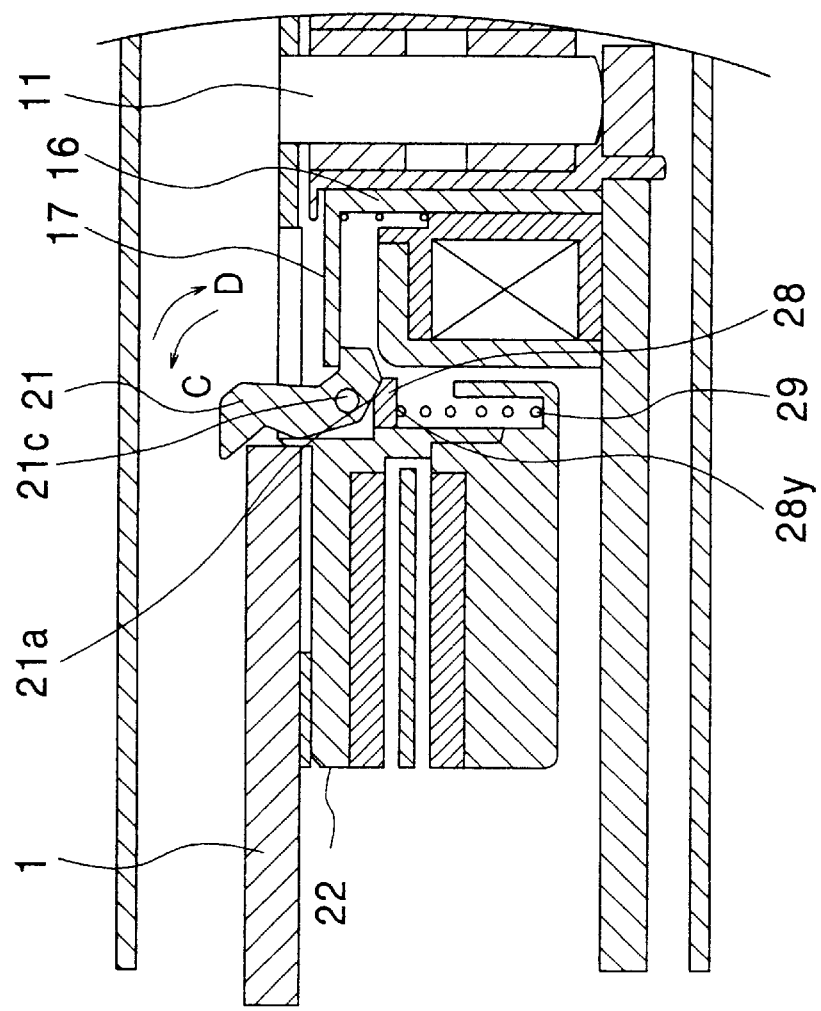

FIG. 3B is an enlarged, cross-sectional view of an important portion, showing a condition in which each clamp member is projected to the engaged position. In FIG. 3B, the clamp member 21 holds the disk 1. The cam surface portion 21a of the clamp member 21 is held in contact with a slanting surface 28y of the press plate 28. The press plate 28 is always urged upwardly by the clamp spring 29, and the point of contact of the clamp member 21 with the slanting surface 28y is disposed radially inwardly of the axis 21c of pivotal movement, and therefore the clamp member 21 is always subjected to a pivotally-moving force in a direction of C. Therefore, the clamp member 21 can be always kept in the engaged condition.

The pivotal movement mechanism, described above in detail, produces the following remarkable effects. Namely, the plunger 16 need only to apply a pressing-up force and a pressing-down force to the clamp members 21 only during the time when the cam surface of each clamp member 21 rotates between the two dead points thereon. Thus, the plunger 16 need only to trigger the position change of the clamp members 21. Therefore, the plunger 16 need only to be energized for the time period necessary for this triggering operation, and the energy can be saved greatly.

Referring again to FIG. 1B, the spindle motor 3 is provided at the outer peripheral portion of the turntable 22 at the reverse surface thereof facing away from the disk-placing surface. The spindle motor 3 has a construction of an axial gap-type DC brushless motor. A rotor magnet 24 is mounted on the outer peripheral portion of the turntable 22. This rotor magnet 24 has a thickness of about 0.5 mm to about 2 mm, and is divided into a plurality of (for example, 8 or 12) N/S poles. A board 25 is provided, and is spaced at a predetermined distance from the rotor magnet 24. A plurality of printed coils, laminated by etching, are formed on the board 25, and function as armature coils (stator coils). In order to achieve a thin design of the motor, the thickness of this board 25 is not more than 1 mm. Further, a lower rotor 26 is provided, and is spaced at a predetermined distance from the board 25. The lower rotor 26 is made of a ferromagnetic material, and the armature coils on the board 25 are interposed between the rotor magnet 24 and the lower rotor 26, and with this construction an electromagnetic drive force can be produced in the spindle motor 3.

Thus, the turntable 22 is formed integrally with the rotor magnet 24 of the motor constituting a magnetic circuit, and with this construction, the thin design of the device is achieved, and also the number of the component parts is reduced.

The disk attaching operation, effected by the above plunger 16 and the above clamp members 21, will now be described. When the coil 19 is excited by exciting current, an electromagnetic force is produced in the direction of an axial thrust of the shaft 11, and the plunger 16 of a magnetic material is attracted by this electromagnetic force, and is moved toward the base 15 (in a direction of arrow B) in parallel to the axis of rotation of the shaft 11. At an initial stage of the movement, the clamp members 21 are pivotally moved in the direction of arrow D by the flange 17. Namely, the cam surface portion of each clamp member 21 is pressed down in the direction of arrow B, so that the clamp member 21 is pivotally moved in the direction of arrow D. When each clamp member 21 is pivotally moved beyond the dead point 21b of the cam surface portion, as shown in FIG. 2A, the clamp member 21 is pressed by the press plate 28, and is further pivotally moved in the direction D, and is received in the turntable 22. In this condition, the disk 1 can be detached or disengaged from the turntable 22.

On the other hand, when the coil 19 is no-exciting condition, the plunger 16 is urged by the plunger spring 20 to be moved in the direction of arrow A, as shown in FIGS. 1B and 3A. The clamp members 21 are pivotally moved in the direction of arrow C by the flange 17. More specifically, at an initial stage of the movement, the claws of the clamp members 21 are pushed up in the direction of arrow A, and the clamp members 21 are pivotally moved in the direction of arrow C. When each clamp member 21 is pivotally moved beyond the dead point 21d of the cam surface portion, the clamp member 21 is pressed by the press plate 28, and is further pivotally moved in the direction C, so that the clamp members 21 are projected from the turntable 22 to be retainingly engaged in the clamp hole 2 in the disk 1, thereby fixing the disk 1.

Thus, in the disk drive apparatus of the first embodiment, when the disk 1 is to be attached to and detached from the turntable 22, there is no part or member which projects from the turntable 22. As a result, there can be obtained the disk drive apparatus which is reduced in thickness in the direction of the axis of the shaft 11.

The plunger 16 is arranged in concentric, coaxial relation to the shaft 11, and can slide on the outer peripheral surface of the bearing housing 13 in the direction of the axis of the shaft 11. Therefore, the motor and the solenoid can have common constituent parts, and by doing so, the clamp mechanism can be formed into a compact design. And besides, since the plunger 16, the bobbin 18 and the coil 19, which are the constituent parts of the solenoid, are provided around the shaft 11, the clamp mechanism can be formed into the thin, compact design. Furthermore, when the plunger 16 is moved, the plunger 16 abuts against the base 15, and thus the base 15 serves as a stopper. In this respect, also, the motor and the solenoid have the common constituent part, and therefore the thin and compact design of the clamp mechanism can be achieved.

Figure 4:
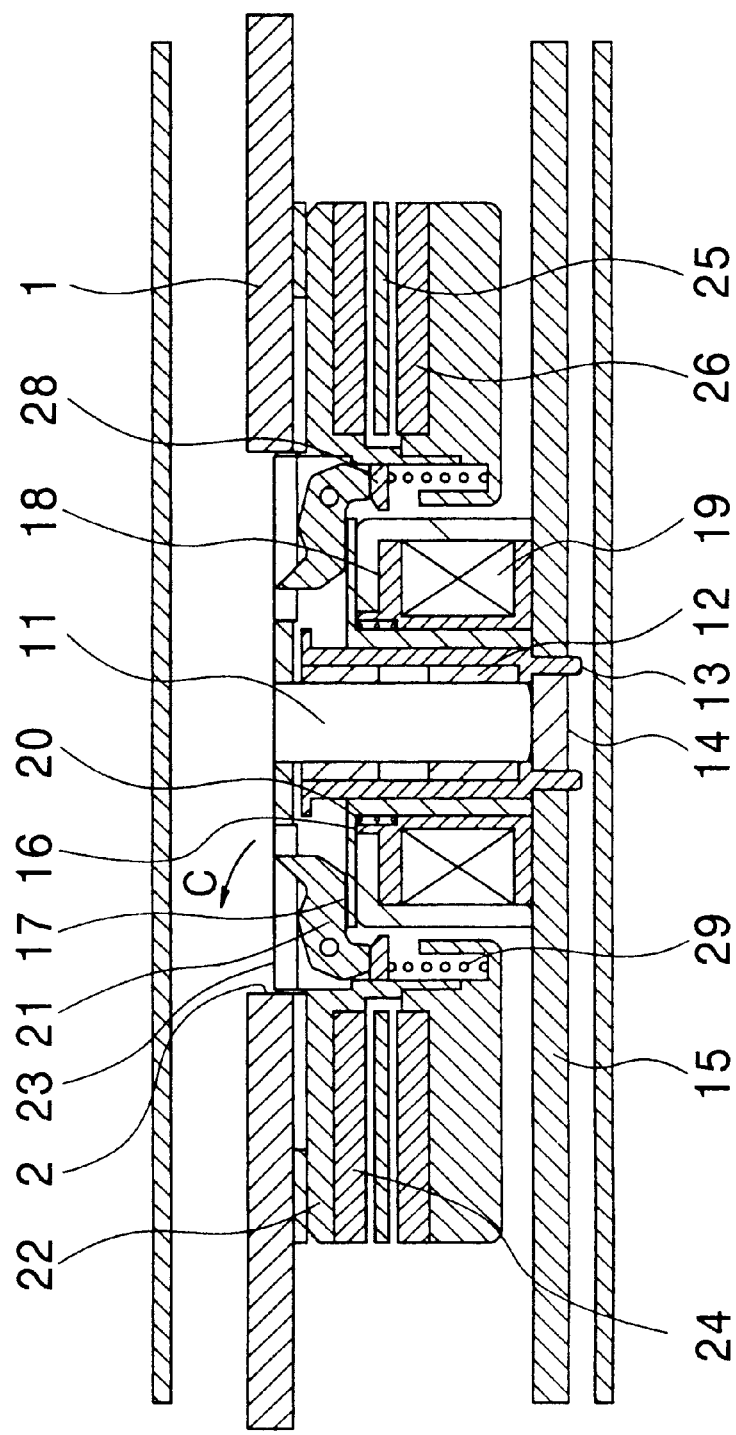
FIG. 4 is a cross-sectional view showing a condition in which a disk is placed on the disk drive apparatus.
Figure 5:
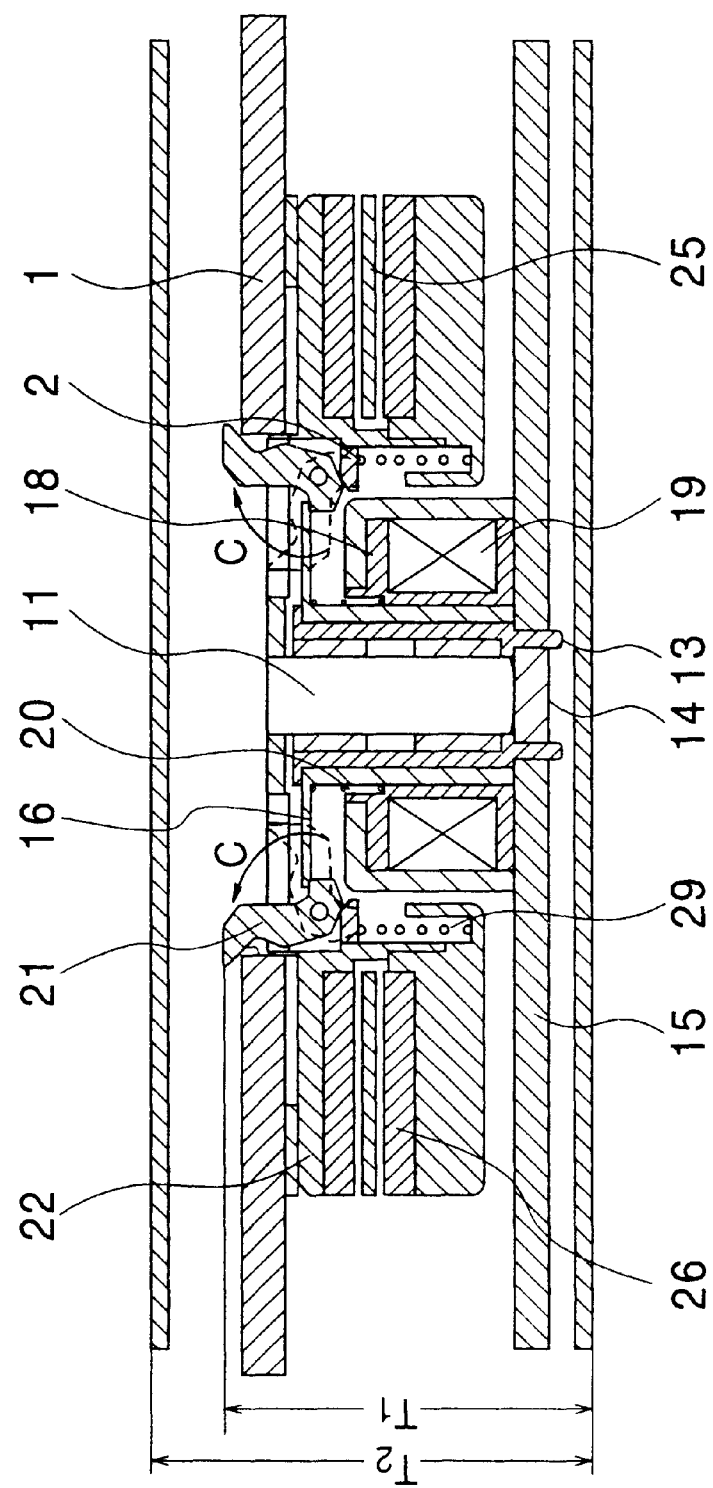
FIG. 5 is a cross-sectional view showing a condition in which the disk drive apparatus attaches the disk.

The operation of the disk drive apparatus, employing the clamp mechanism of the above construction, will be described. FIG. 4 is a cross-sectional view showing a condition in which the disk is placed on the disk drive apparatus. First, in FIG. 1B, (1) the user holds the disk 1 with his fingers, and puts this disk 1 into a disk insertion hole. As a result, this disk 1 is introduced into the disk drive apparatus from one side of the turntable 22 (that is, from the right side as indicated by arrow X in FIG. 1B). (2) Then, when about a half of the disk 1 is inserted, with its central hole introduced into the disk drive apparatus, this disk 1 is transferred to the turntable 22 by transfer means (e.g. a belt conveyor which is no matter of the present invention, and therefore explanation and illustration thereof will be omitted here), and is placed on the center hub 23. FIG. 4 shows the disk in this condition. During the above periods (1) and (2), the coil 19 is excited by exciting current, so that the clamp members 21 are received in the turntable 22. (3) Then, when the disk is thus placed on the turntable, the exciting current in the coil 19 is cut-off. As a result, the plunger 16 moves upward, so that the clamp members 21 are pivotally moved in the direction C, and are projected from the turntable 22, as described before. (4) The clamp members 21 are further pivotally moved in the direction C under the pressing force of the clamp spring 29 to be projected from the turntable 22, and are retainingly engaged with edge of the clamp hole 2 in the disk 1, thereby fixing the disk 1. The clamping force, produced by the clamp members 21 at this time, can be adjusted by adjusting the spring force of the clamp spring 29. FIG. 5 is a cross-sectional view showing a condition in which the disk drive apparatus fixes the disk in FIG. 1B. In this manner, the fixing of the disk 1 is finished.

Figure 6:
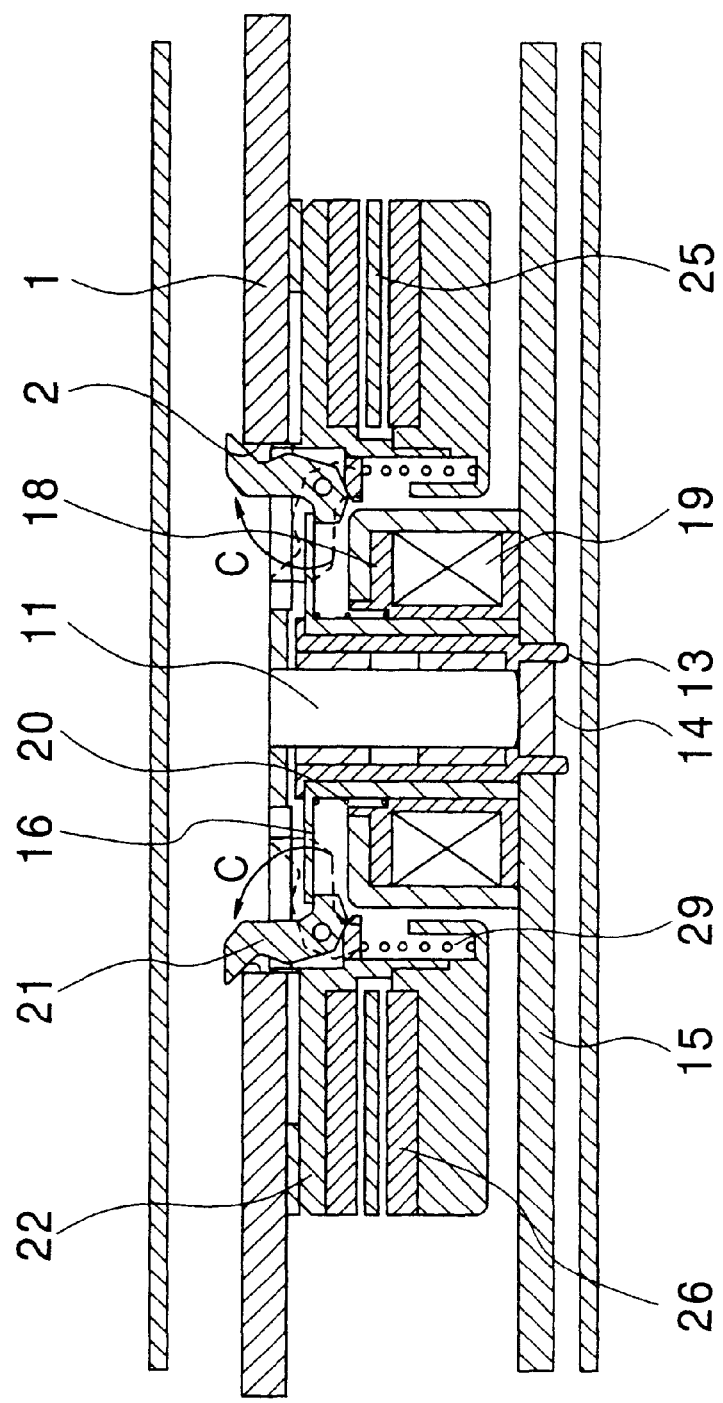
FIG. 6 is a cross-sectional view showing a condition in which the disk drive apparatus of FIG. 1 clamps a thin disk.
Figure 7:
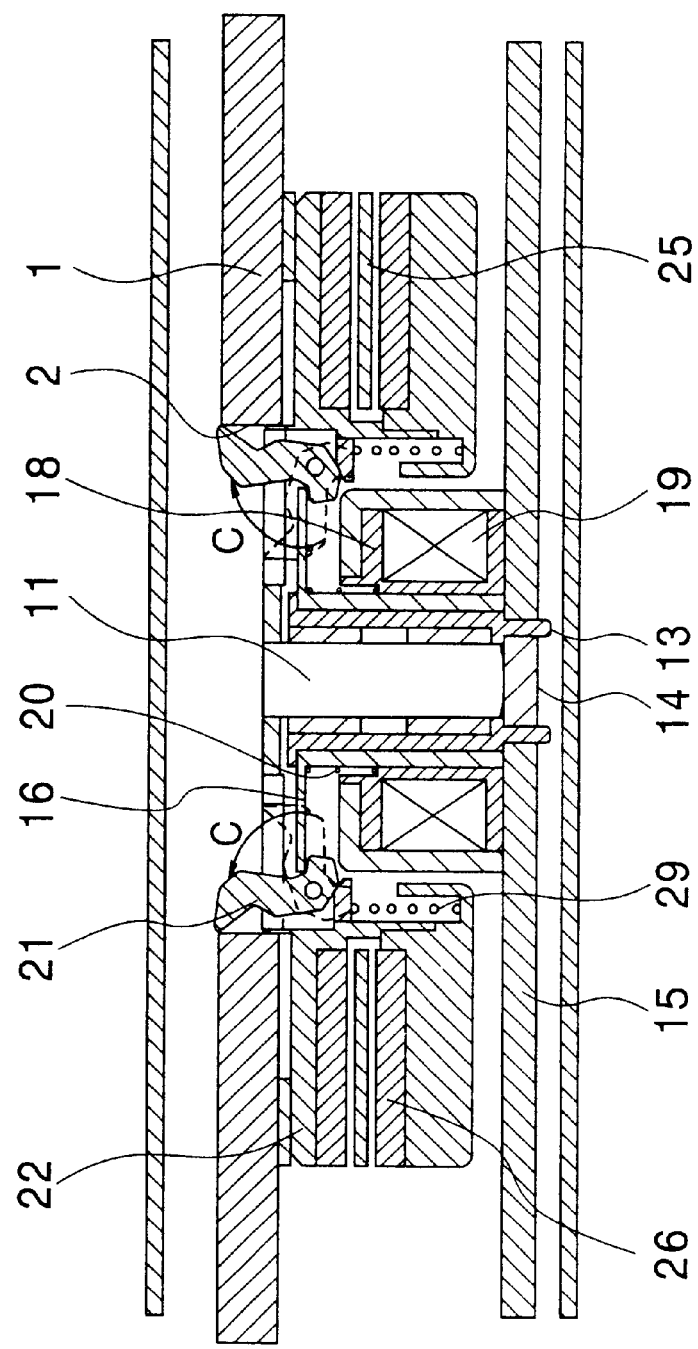
FIG. 7 is a cross-sectional view showing a condition in which the disk drive apparatus of FIG. 1 clamps a thick disk.

In FIG. 5, the disk 1 has a thickness of 1.2 mm which is the thickness of a standard disk. However, there are occasions when an off-specification disk is used. For example, FIG. 6 shows a condition in which a thin disk (having a thickness of about 1 mm) is clamped, and FIG. 7 shows a condition in which a thick disk (having a thickness of about 1.7 mm) is clamped. AS shown in FIGS. 6 and 7, the clamp members 21 fix the clamp hole 2 under the spring force of the clamp spring 29, and therefore even if disks of difference thicknesses (for example, in the range of about from 1 mm to 1.7 mm) are used, these disks can be positively fixed by the clamp members 21.

And besides, in the disk drive apparatus of the present invention, the clamp members are fixedly engaged with the edge of the clamp hole 2, and therefore even if disks have different outer diameters (for example, 8 cm and 12 cm), these disks can be positively fixed. Furthermore, even a disk whose outer shape is not circular can be positively fixed.

The spindle motor 3 and the disk clamp mechanism are integrally formed with each other in a concentric manner, and the thickness of this integral construction (from the outer surface of the base 15 to the distal end of each clamp member 21 in the clamped condition) is equal to or less (not more) than 11.5 mm. With this construction, the overall thickness of the disk drive apparatus, including the space used for transferring the disk 1, can be made not more than 12.7 mm. As a result, the disk drive apparatus can be mounted even on a note book-type computer required to have a compact, thin design, and the disk drive apparatus of high convenience can be provided to the operator.

In the first embodiment, the disk is released upon energization whereas the disk is held or retained upon de-energization. Referring to this reason, when the disk is attached, power consumption for the driving of the spindle motor 3 increases, and therefore the coil 19 is energized when the disk is released, and by doing so, the power consumption can be leveled. However, the clamp mechanism of the present invention is not limited to such a mode of use, but the disk can be held upon energization, and can be released upon de-energization by suitably applying the plunger 16, the polarity of the coil 19, the plunger spring 20 and the clamp spring 29 to other combination. Such a modification can be derived from the present invention, and will be readily appreciated, and therefore explanation thereof will be omitted.

Figure 8A:
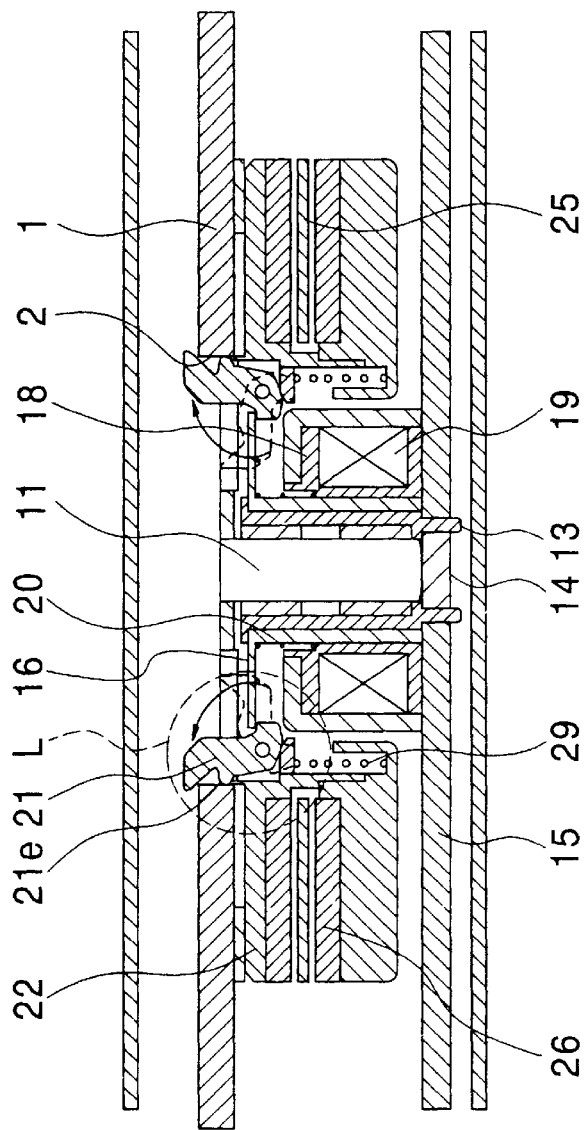
FIG. 8A is a cross-sectional view showing a clamp mechanism portion of the disk drive apparatus of FIG. 1
Figure 8B:
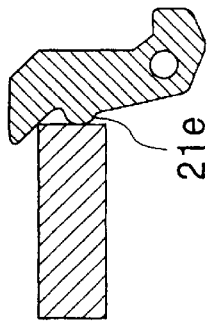
FIG. 8B is an enlarged cross-section view of an important portion of L in FIG. 8A.

Using the following constructions in addition to the construction described above in detail, the advantages and conveniences are further enhanced. One example thereof is shown in FIGS. 8A and 8B. FIG. 8A is a cross-sectional view showing the clamp mechanism of the disk drive apparatus of FIG. 1B and FIG. 8B is an enlarged view of an important portion of L in FIG. 8A. In these Figures, a projection 21e is formed on the clamp member 21. The projection 21e is formed on that portion of the clamp member 21 which can abut against the edge of the clamp hole 2.

The clamp member 21 is pivotally moved by the triggering operation of the plunger 16, and abuts against the edge of the clamp hole 2. At this time, a rotating stress (torque), acting obliquely downwardly, is always applied to the peripheral edge of the clamp hole 2 from the upper side by the claw of each clamp member 21. Therefore, by forming the projection 21e on each clamp member 21, forces, applied respectively from the projections 21e of the clamp members 21, instead of such rotating stresses, can bring the clamp hole 2 into agreement with the center. Thus, the centering of the disk 1 can be easily effected.

Figure 9:
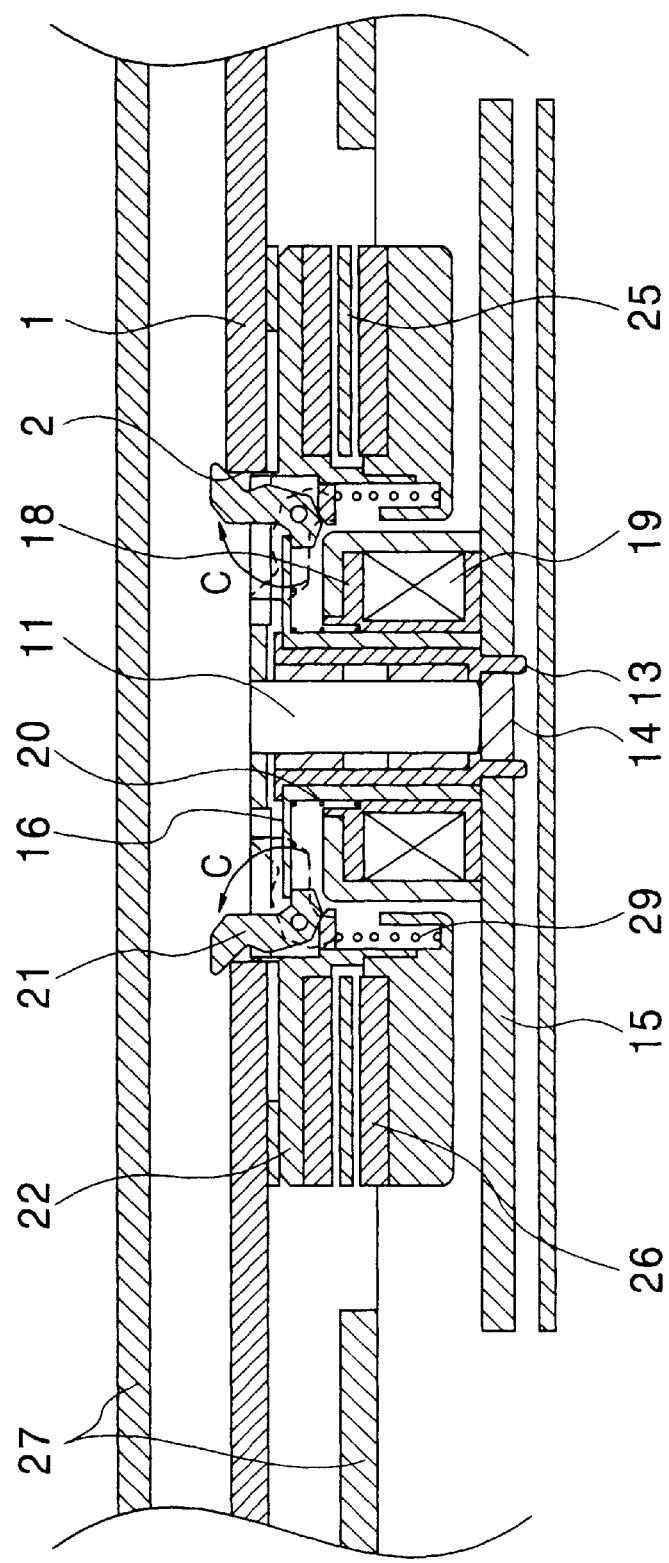
FIG. 9 is a view showing a condition in which a disk, contained in a cartridge, is attached to the disk drive apparatus of FIG. 1.

Another example will be described. FIG. 9 is a view showing a condition in which a disk, contained in a cartridge, is attached to the disk drive apparatus of FIG. 1. Examples of disk mediums include the kind (e.g. a MD, a PD and a DVD-RAM) in which a disk is contained in a cartridge 27. In the disk drive apparatus of the present invention, there is no portion or part which projects from the turntable 22 to the disk-attaching surface, as described above. And besides, the pivotal movement mechanism of the clamp member 21 is received in the turntable 22. Therefore, not only the bare disk 1 but also the disk 1, contained in the cartridge 27, can be easily attached to and detached from the turntable.

As described above, in the present invention, the fixing and release of the disk 1 can be controlled by non-exciting and exciting the coil 19, and therefore there can be provided the disk drive apparatus capable of automatic attachment of the disk 1. And besides, the first embodiment can provide the disk drive apparatus which is the solenoid type having the movable plunger 16, and in which the number of the component parts is reduced, thus providing the compact and sturdy design of the disk drive apparatus.

Second Embodiment

Figure 10:
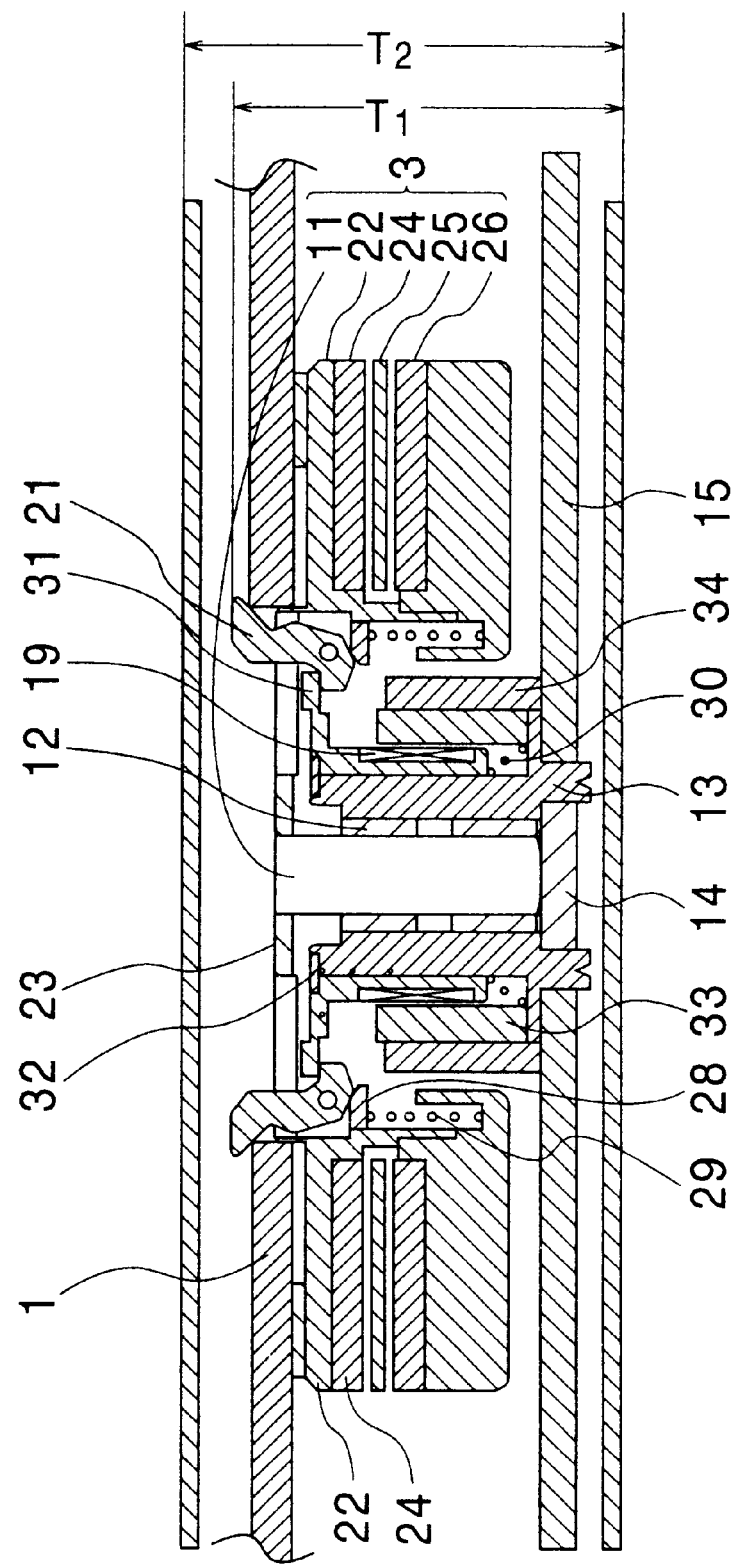
FIG. 10 is a cross-sectional view of a second embodiment of a disk drive apparatus according to the invention.
Figure 11A:
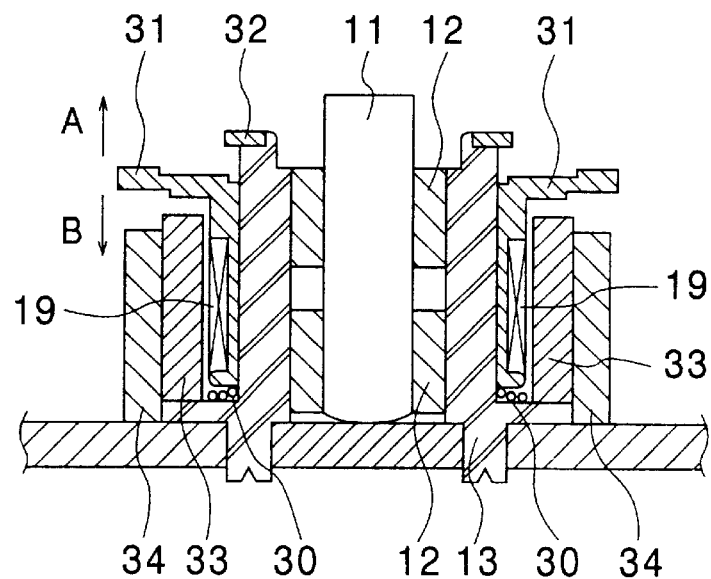
FIG. 11A and 11B are an enlarged, cross-sectional views showing a voice coil motor portion of FIG. 10.

In a second embodiment, instead of the solenoid type, a voice coil motor (VCM), employed in a linear motor and so on, is used as reciprocally-moving means. The second embodiment will now be described with reference to the drawings. FIG. 10 is a cross-sectional view of a disk drive apparatus according to the second embodiment of the present invention, and FIG. 11A is an enlarged, cross-sectional view of a voice coil motor portion of FIG. 10. In FIGS. 10 and 11A, reference numeral 3 denotes a spindle motor, reference numeral 11 a shaft, reference numeral 12 a bearing, reference numeral 13 a bearing housing, reference numeral 14 a thrust bearing, reference numeral 15 a base, reference numeral 19 a coil, reference numeral 21 a clamp member, reference numeral 22 a turntable, reference numeral 23 a center hub, reference numeral 24 a rotor magnet, reference numeral 25 a board, reference numeral 26 a lower rotor, reference numeral 28 a press plate, and reference numeral 29 a clamp spring. These constituent parts are similar in configuration and material to those described above for the first embodiment, and therefore explanation thereof will be omitted here.

The main difference of the second embodiment from the first embodiment resides in the construction of the voice coil motor. A slider 31 can slide on an outer peripheral surface of the bearing housing 13 in a direction of the axis of the shaft 11. The slider 31 is made of a material (e.g. aluminum) which is lightweight, and has rigidity to a certain degree. A slider spring 30 acts between the bearing housing 13 and the slider 31 to urge the slider 31 toward a disk-placing surface (that is, in a direction of arrow A in FIG. 11A) as in the first embodiment. The slider spring 30 is a compression coil spring formed by winding a wire element into a generally conical shape. When the slider spring 30 is fully compressed, the turns of the coil wire do not overlap each other for the slider 31 reaching its bottom position (see FIG. 11A). A stopper 32 limits the upward movement of the slider 31. The stopper 32 also prevents the slider 31 from contacting the clamp members 21 when the disk 1 is chucked. A linear magnet 33 is made of a ferromagnetic material, and is formed into a cylindrical shape. Those surface of the linear magnet 33, disposed perpendicular to the axis of the shaft 11 (that is, disposed radially of the spindle motor 3), are magnetized to have magnetic poles. The slider 31 is provided around the outer periphery of the bearing housing 13, and the linear magnet 33 is provided around the outer periphery of the slider 31, and these are mounted coaxially with the shaft 11. A back yoke 34 has the function of efficiently producing a magnetic flux between the bearing housing 13 and the linear magnet 33. With the above construction, when the coil 19 is excited, coil current flows across the magnetic flux, so that the slider 31 is moved upward and downward along the outer peripheral surface of the bearing housing 13.

In the second embodiment of the present invention having the above construction, the slider 31 moves together with the coil 19, and therefore the moving coil-type is provided. Except the moving coil-type, the operation from the placing of the disk 1 on the turntable 22 to the completion of the fixing of the disk by the clamp member 21 is similar to that described above for the first embodiment. Therefore, description of the operation of the second embodiment will be omitted here. In the solenoid type of the first embodiment, the electromagnetic force varies in accordance with the position of the plunger 16. On the other hand, in the moving coil-type, the drive force is determined by the electric current and the magnetic flux, and therefore the clamp members 21 can be smoothly operated by controlling the coil current.

Figure 12A:
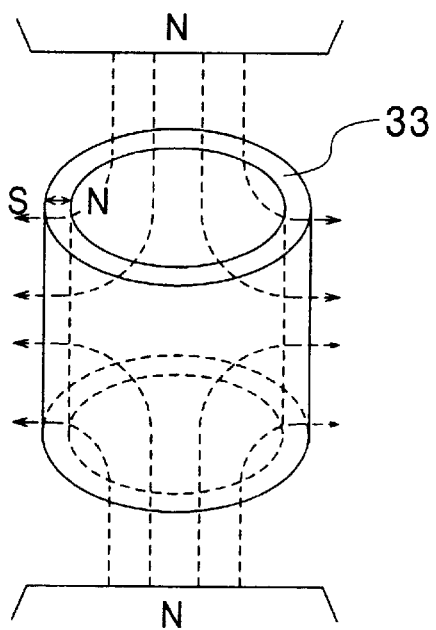
FIGS. 12A and 12B are views explanatory of the magnetization of a linear magnet of the second embodiment, FIG. 12A being a view illustrating its principle, and FIG. 12B being a schematic view showing the actual magnetizing operation.
Figure 12B:
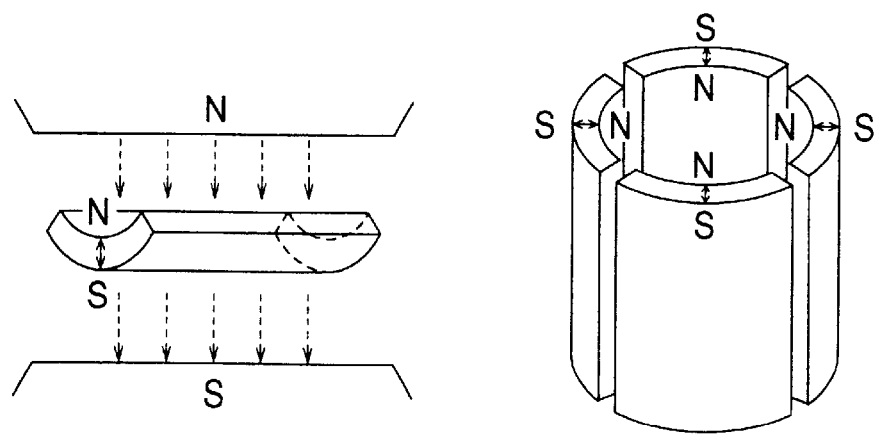

Next, the magnetization of the linear magnet 33 will be described. FIGS. 12A and 12B are views explanatory of the magnetization of the linear magnet. The linear magnet 33 has a cylindrical shape as shown in FIG. 11A. The principle of magnetization is well known, and a material, having a high coercive force, is placed in a magnetic field so as to be magnetized. Therefore, for magnetizing a cylindrical member, it is necessary to provide magnetic poles of the same polarity in opposed relation to each other as shown in FIG. 12A (which shows the principle), and in this case it is difficult to obtain the uniform magnetization (and hence the uniform magnetic flux). Therefore, the linear magnet 33 is circumferentially divided into four sections, and each of the four sections is magnetized in a uniform magnetic field, as shown in FIG. 12B. These four sections are combined together into a cylindrical shape to thereby provide the linear magnet 33 which produces a uniform, high magnetic flux.

Figure 11B:
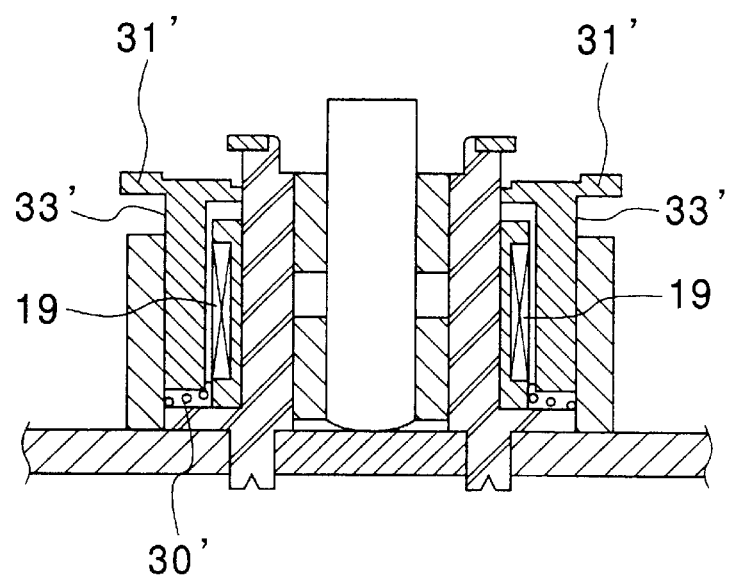

FIG. 11B shows a modified construction, and in contrast with the construction of FIG. 11A, a coil 19 and a bobbin are fixed, and a slider 31' is fixed to a linear magnet 33', and the linear magnet 33' is reciprocally movable, thus providing the moving magnet-type. In this construction, the operation and the magnetization of the linear magnet 33' are similar to those described above for the moving coil-type, and therefore explanation thereof will be omitted here.

Figure 13:
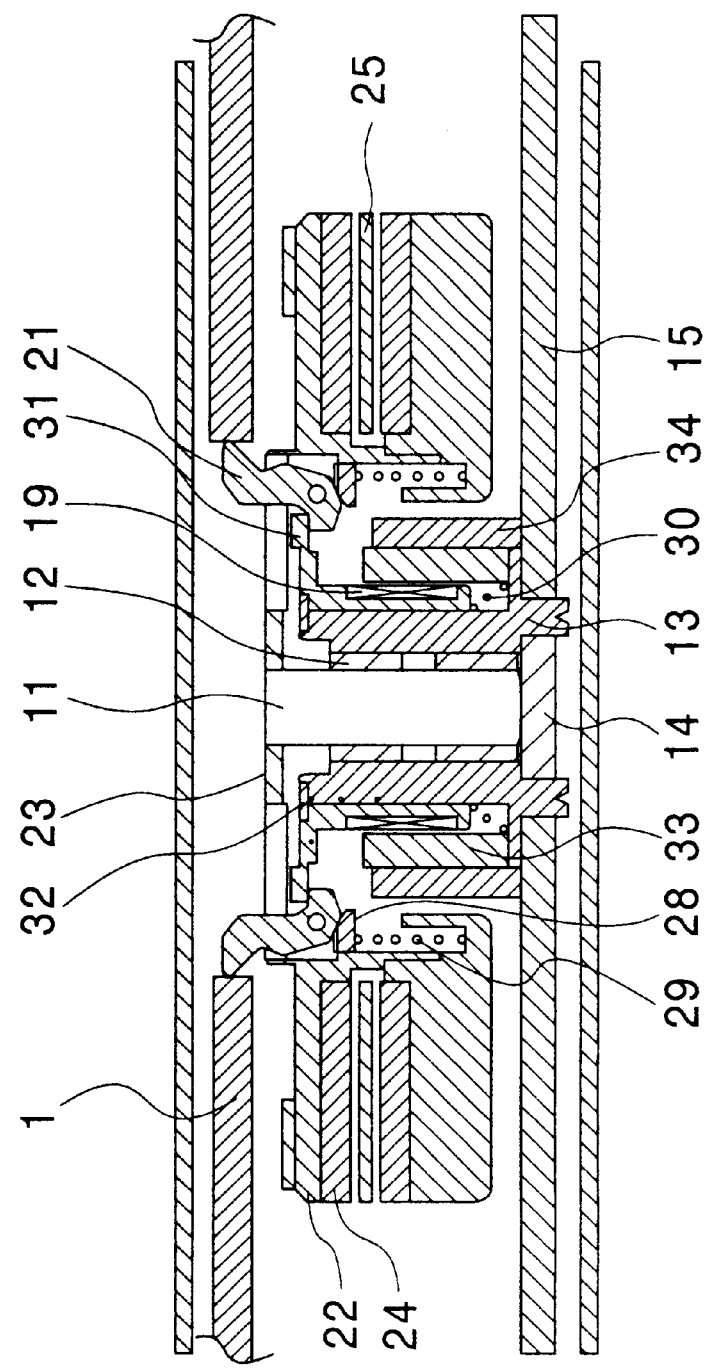
FIG. 13 is a view showing a forcible discharge position of the disk in the second embodiment.

Next, the operation of the clamp members 21, effected when forcibly discharging the disk 1, will be described. Let's assume that power failure occurs when the disk 1 is held in the fixed condition in the disk drive apparatus of the first or the second embodiment. In this case, the operator mechanically discharges the disk 1 in a forcible manner. Therefore, by the forcible discharge operation (usually effected by an eject button (not shown)), the disk 1 is lifted from the engaged position (shown in FIG. 5 or FIG. 10) to a path (shown in FIG. 13) for the forcible discharge. FIG. 13 shows the forcible discharge position. At this time, each clamp member 21 is disposed at the dead point position as described before in connection with the operation of the clamp member 21, and therefore the clamp member 21 remains at the dead point position, and also the disk 1 remains at the forcible discharge position.

Then, when the disk 1 is moved in a discharge direction by continuing the forcible discharge operation, one or two of the three clamp members 21 are pressed against the inner peripheral edge of the disk 1. As a result, the thus pressed clamp member(s) 21 is pivotally moved in the direction toward the received position. When the disk 1 continues to move, the cam surface portion 21a is angularly moved beyond the dead point. Further, the clamp member 21 is pressed to be pivotally moved, so that the rear surface of the clamp member presses down the plunger 16 or the slider 31. As a result, the other one or two clamp members 21 are pushed at their cam surface 21a by the plunger 16 or the slider 31, and begin to be pivotally move. Finally, the cam surface portion 21a is angularly moved beyond the other dead point, and the plunger spring 20, the slider spring and the clamp spring 29 are so balanced with one another that the clamp members 21 are held in their respective received positions. Thus, all of the clamp members 21 are received in the turntable 22, thereby enabling the discharge of the disk 1.

Figure 14A:
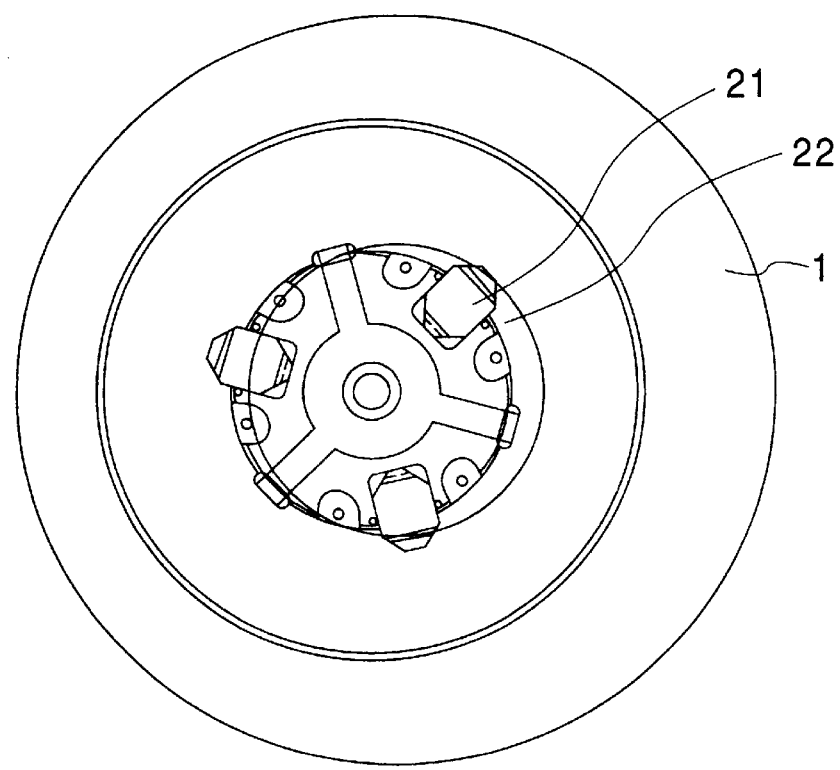
FIGS. 14A and 14B are views showing the case where the disk is placed off-center on the turntable in the first embodiment, FIG. 14A being a plan view, and FIG. 14B being a vertical cross-sectional view.
Figure 14B:
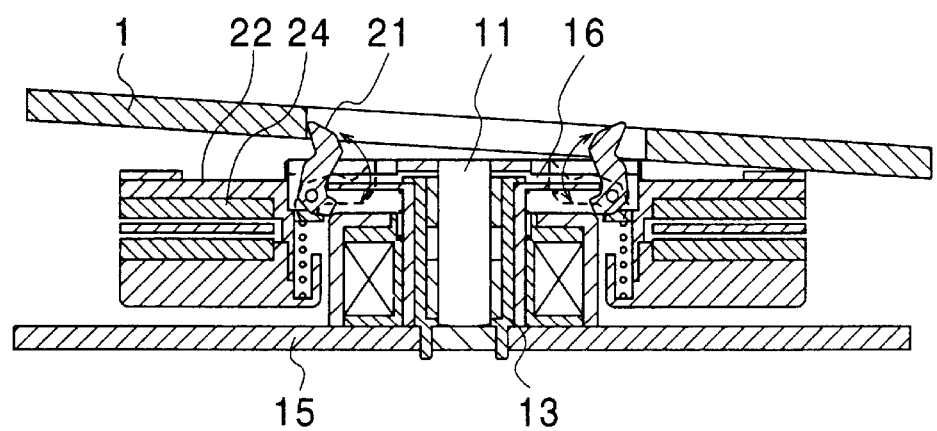

Let's consider another abnormal condition. As described above in FIG. 4, the disk 1 is placed on the center hub 23. However, when the disk 1 is placed on the center hub 23, the disk 1 is not always centered (that is, not aligned with the center hub 23), which is caused by various errors. FIG. 14 is a view showing a condition in which the disk is placed off-center on the center hub.

However, as described above in detail for the operation of the clamp member 21, when each clamp member 21 is to fix the disk 1, the distal end of the clamp member 21 moves along a path extending from the inner peripheral side to the outer peripheral side of the turntable 22. Therefore, even if the disk 1 is disposed off-center, the clamp members 21 can fix the disk 1 while correcting the position of the disk 1. For the same reason, even if the inner diameter of the hole in the disk, as well as its thickness, is changed, the clamp members 21 can fix the disk 1 while correcting the position of the disk. Namely, any particular precision is not required for the mechanism for transferring the disk from the insertion hole to the turntable. Therefore, the transfer mechanism can have a simple and inexpensive construction, and the disk drive apparatus can be produced at lower costs.

As in the first and second embodiments, the spindle motor and the disk clamp mechanism are integrally formed with each other in a concentric manner, and its thickness T1 (from the outer surface of the base 15 to the distal end of each clamp member 21 in the clamped condition) (see FIG. 10) is not more than 11.5 mm. With this construction, the overall thickness T2 of the disk drive apparatus, including the space used for transferring the disk 1, can be made not more than 12.7 mm. As a result, the disk drive apparatus can be mounted even on a note book-type computer required to have a compact, thin design, and the disk drive apparatus of high convenience can be provided to the operator.

The voice coil motor of the above construction, serving as the reciprocally-moving means, can use the bearing housing 13 as part of the magnetic circuit instead of the back yoke. Therefore, the thinner and more compact design of the clamp mechanism can be achieved.

In addition to the features of the first embodiment, the second embodiment of the above construction has the feature that the elements of the reciprocally-moving mechanism can be made of a relatively lightweight material, so that the reciprocal movement can be achieved by less electromagnetic energy.

As described above in detail, in the present invention, there is provided the disk drive apparatus suited for a compact and lightweight design and a thin design, and there are provided the medium attaching device and the disk drive apparatus in which the automatic attachment of the disk can be effected without the need for the attaching operation by the operator.

What is claimed is:

1. A medium attaching device comprising rotary support means for holding a disk medium thereon, and rotation drive means for rotating said rotary support means so as to rotate said disk medium;
    wherein said rotation drive means includes reciprocally-moving means for reciprocal movement in a direction of an axis of a rotation shaft;
    wherein said rotary support means has a plurality of pivotal attaching means pivotally mounted thereon, and each of said pivotal attaching means is pivotally movable between a fixed position where said pivotal attaching means fixedly holds said disk medium and a received position where said pivotal attaching means is received in said rotary support means so that a claw portion of said pivotal attaching means retracts into said rotary support means, and said plurality of pivotal attaching means is provided on said rotary support means in concentric relation to the axis of said rotation shaft; and
    wherein said pivotal attaching means is engaged with said reciprocally-moving means, and is pivotally moved by the reciprocal movement of said reciprocally-moving means, thereby fixing and releasing said disk medium relative to said rotary support means.

2. A disk drive apparatus for holding and rotating a disk medium, comprising a medium attaching device as defined in claim 1.

3. A medium attaching device comprising rotary support means for holding a disk medium thereon, and rotation drive means for rotating said rotary support means so as to rotate said disk medium;
    wherein said rotation drive means includes reciprocally-moving means, which is mounted around an outer periphery of a rotation shaft in coaxial relation thereto so as to reciprocally move in a direction of an axis of said rotation shaft, and exciting means wound around the outer periphery of said rotation shaft;
    wherein said rotary support means has a plurality of pivotal attaching means pivotally mounted thereon, and each of said pivotal attaching means is pivotally movable between a fixed position where said pivotal attaching means fixedly holds said disk medium and a received position where said pivotal attaching means is received in said rotary support means, and said plurality of pivotal attaching means is provided on said rotary support means in concentric relation to the axis of said rotation shaft; and
    wherein said pivotal attaching means is engaged with said reciprocally-moving means, and is pivotally moved by the reciprocal movement of said reciprocally-moving means, thereby fixing and releasing said disk medium relative to said rotary support means.

4. A medium attaching device according to claim 3, in which said reciprocally-moving means is made of a ferromagnetic material, and is reciprocally moved by a magnetic attraction force produced by said exciting means.

5. A medium attaching device according to claim 3, in which said reciprocally-moving means is constructed integrally with said exciting means, and a perpendicular magnetic body made of a ferromagnetic material and formed in a generally cylindrical shape, which is magnetized perpendicularly to the axis of said rotation shaft, is disposed around an outer periphery of said reciprocally-moving means in coaxial relation to said rotation shaft.

6. A medium attaching device according to claim 3, in which said reciprocally-moving means is made of a ferromagnetic material, and is formed into a perpendicular magnetic body of a generally cylindrical shape which is magnetized perpendicularly to the axis of said rotation shaft, and said exciting means is wound on the outer periphery of said reciprocally-moving means in coaxial relation to said rotation shaft.

7. A disk drive apparatus for holding and rotating a disk medium so as to reproduce information, comprising a medium attaching device as defined in claim 3.

8. A medium attaching device according to claim 3, in which a thickness of said medium attaching device in a plane, including the axis of said rotation shaft, is equal to or less than 11.5 mm.

9. A disk drive apparatus for holding and rotating a disk medium so as to reproduce information, comprising a medium attaching device as defined in claim 8.

10. A disk drive apparatus according to claim 9, in which an overall thickness of said disk drive apparatus is equal to or less than 12.7 mm.

11. A medium attaching device comprising rotary support means for holding a disk medium thereon, and rotation drive means for rotating said rotary support means so as to rotate said disk medium;

wherein said rotation drive means includes reciprocally-moving means, which is mounted around an outer periphery of a rotation shaft in coaxial relation thereto so as to reciprocally move in a direction of an axis of said rotation shaft, and exciting means wound around the outer periphery of said rotation shaft;

wherein said rotary support means has a plurality of pivotal attaching means pivotally mounted thereon, and each of said pivotal attaching means is pivotally movable between a fixed position where said pivotal attaching means fixedly holds said disk medium and a received position where said pivotal attaching means is received in said rotary support means, and said plurality of pivotal attaching means are provided on said rotary support means in concentric relation to the axis of said rotation shaft;

wherein there is provided urging means which assists said pivotal attaching means in being pivotally moved, and urges said pivotal attaching means so that said pivotal attaching means can remain at said fixed position and said received position;

wherein each of said pivotal attaching means has a claw for retaining said disk medium, and a cam surface portion which receives an urging force of said urging means; and wherein said pivotal attaching means are engaged with said reciprocally-moving means, and are pivotally moved by the reciprocal movement of said reciprocally-moving means, thereby fixing and releasing said recording medium relative to said rotary support means.

12. A medium attaching device according to claim 11, in which said claw has a projection for abutment against an inner surface of a central hole in said disk medium, and said cam surface portion has a first dead point, which initiates the pivotal movement of said pivotal attaching means toward said fixed position upon reception of the urging force of said urging means, and a second dead point which initiates the pivotal movement of said pivotal attaching means toward said received position upon reception of the urging force of said urging means.

13. A medium attaching device according to claim 11, in which said reciprocally-moving means is made of a ferromagnetic material, and is reciprocally moved by a magnetic attraction force produced by said exciting means.

14. A medium attaching device according to claim 11, in which said reciprocally-moving means is constructed integrally with said exciting means, and is formed into a perpendicular magnetic body made of a ferromagnetic material and formed in a generally cylindrical shape, which is magnetized perpendicularly to the axis of said rotation shaft, is disposed about an outer periphery of said reciprocally-moving means in coaxial relation to said rotation shaft.

15. A medium attaching device according to claim 11, in which said reciprocally-moving means comprises a perpendicular magnetic body made of a ferromagnetic material and formed in a generally cylindrical shape, which is magnetized perpendicularly to the axis of said rotation shaft, and said exciting means is wound on the outer periphery of said reciprocally-moving means in coaxial relation to said rotation shaft.

16. A disk drive apparatus for holding and rotating a disk medium so as to reproduce information, comprising a medium attaching device as defined in claim 11.

17. A medium attaching device according to claim 11, in which a thickness of said medium attaching device in a plane, including the axis of said rotation shaft, is equal to or less than 11.5 mm.

18. A disk drive apparatus for holding and rotating a disk medium so as to reproduce information, comprising a medium attaching device as defined in claim 17.

19. A disk drive apparatus according to claim 18, in which an overall thickness of said disk drive apparatus is equal to or less than 12.7 mm.

\* \* \* \* \*